(12) United States Patent
Huff

(10) Patent No.: US 12,139,651 B2
(45) Date of Patent: Nov. 12, 2024

(54) CHANNELED SEAM TAPE

(71) Applicant: Alpha Systems, LLC, Elkhart, IN (US)

(72) Inventor: Troy R. Huff, Elkhart, IN (US)

(73) Assignee: Alpha Systems, LLC, Elkhart, IN (US)

( * ) Notice: Subject to any disclaimer, the term of this patent is extended or adjusted under 35 U.S.C. 154(b) by 655 days.

(21) Appl. No.: 17/244,077

(22) Filed: Apr. 29, 2021

(65) Prior Publication Data
US 2022/0348797 A1    Nov. 3, 2022

(51) Int. Cl.
    *C09J 7/38*   (2018.01)
    *C09J 7/25*   (2018.01)
    *E04D 11/02*  (2006.01)
    *B60P 3/32*   (2006.01)

(52) U.S. Cl.
    CPC .............. *C09J 7/383* (2018.01); *C09J 7/255* (2018.01); *E04D 11/02* (2013.01); *B60P 3/32* (2013.01); *C09J 2301/122* (2020.08); *C09J 2301/204* (2020.08); *C09J 2409/00* (2013.01); *C09J 2467/006* (2013.01)

(58) Field of Classification Search
    CPC ...... C09J 7/383; C09J 7/255; C09J 2301/122; C09J 2301/204; C09J 2409/00; C09J 2467/006; E04D 11/02; B60P 3/32; Y10T 428/14; Y10T 428/28
    See application file for complete search history.

(56) References Cited

U.S. PATENT DOCUMENTS

| | | | | |
|---|---|---|---|---|
| 3,523,859 | A * | 8/1970 | Komp | C09J 7/21 428/343 |
| 4,096,007 | A * | 6/1978 | Braunling | C09J 7/21 174/120 SR |
| 5,861,348 | A * | 1/1999 | Kase | B32B 7/12 602/903 |
| 6,398,830 | B1 * | 6/2002 | Rhodes | E04C 2/543 55/528 |
| 8,153,219 | B2 * | 4/2012 | Hooft | E04C 2/543 428/41.9 |
| 9,151,040 | B2 * | 10/2015 | Coates | D04H 13/007 |
| 2021/0403763 | A1 * | 12/2021 | Schafer | E04F 13/0896 |
| 2022/0298801 | A1 * | 9/2022 | Pointl | C09J 7/381 |

* cited by examiner

*Primary Examiner* — Patricia L. Nordmeyer
(74) *Attorney, Agent, or Firm* — Gardner, Linn, Burkhart & Ondersma LLP

(57) ABSTRACT

A channeled seam tape includes a liquid permeable facer sheet attached to an adhesive portion, where the adhesive portion defines a channeled portion. A removable liner covers the adhesive portion and can be removed to press the tape onto a pair of adjacent substrate surfaces. Once the tape has been pressed onto the substrate surfaces, the adhesive portion covers a gap located between the substrate surfaces and adheres to each substrate surface.

20 Claims, 4 Drawing Sheets

CHANNELED SEAM TAPE

FIELD OF THE INVENTION

The Present invention relates generally to the field of roof construction, and more particularly to a channeled seam tape used for covering seams in roofing substrates.

BACKGROUND OF THE INVENTION

A finished roof may have various layers that are bonded together by an adhesive, such as a flexible roofing membrane bonded to a substrate by a water-based adhesive. The water-based adhesive cures as its water seeps into the porous lower substrate of the roof, leaving behind a residual adhesive that bonds the roofing membrane layer and substrate together. The lower layer of the roof may be made of an array of adjacent substrate panels. Before bonding the roofing membrane to adjacent substrate panels, a tape may be applied to the seam of two adjacent substrate panels to cover the gap or seam between the adjacent substrate panels to inhibit cosmetic defects on the finished roof such as air bubbles and/or soft ridges forming at the seams. Tape used in this manner may inhibit water movement from the water-based adhesive to the lower substrate panels, thereby resulting in "wet spots" which also may cause cosmetic defects in the finished roof.

SUMMARY OF THE INVENTION

The present invention is directed toward a channeled seam tape used for constructing a roof assembly, and in particular, for constructing a recreational vehicle roof assembly. The channeled seam tape of the present invention facilitates water transmission from the water-based adhesive, through the entirety of the tape, and into the substrate layer. The channeled seam tape includes a liquid permeable facer sheet, an adhesive portion, and a removable liner. The adhesive portion is coupled to the facer sheet and defines channels. The facer sheet covers the adhesive portion to prevent the tape from binding to itself while it is rolled up. Water from a water-based adhesive is able to move through the tape via the channels while the tape is adhered to a substrate by passing through the facer sheet and the channels. This prevents water from the water-based adhesive from pooling on or in the tape and reduces the likelihood of cosmetic roofing defects.

According to one form of the present invention, a channeled seam tape includes a liquid permeable facer sheet to which an adhesive portion is applied. The adhesive portion defines one or more channels, and is covered by a removable liner opposite the facer sheet. Once the liner has been removed, the tape can be aligned over a gap or seam located between a pair of adjacent substrate panels and pressed onto the substrate surfaces such that the adhesive portion adheres to each substrate surface.

In one aspect, the adhesive portion includes a center adhesive strip spaced between a pair of outer adhesive strips, where the adhesive strips extend along the length of the tape to thereby define a pair of channels extending along the length of the tape.

In another aspect, the center adhesive strip covers the seam located between the adjacent substrate panels while also adhering to each substrate surface after the tape has been pressed onto the substrate surfaces.

In yet another aspect, each of the outer adhesive strips adheres to a respective substrate surface after the tape has been pressed onto the substrate panels.

These and other objects, advantages, purposes and features of the present invention will become apparent upon review of the following specification in conjunction with the drawings.

DESCRIPTION OF THE PREFERRED EMBODIMENTS

Figure 1:
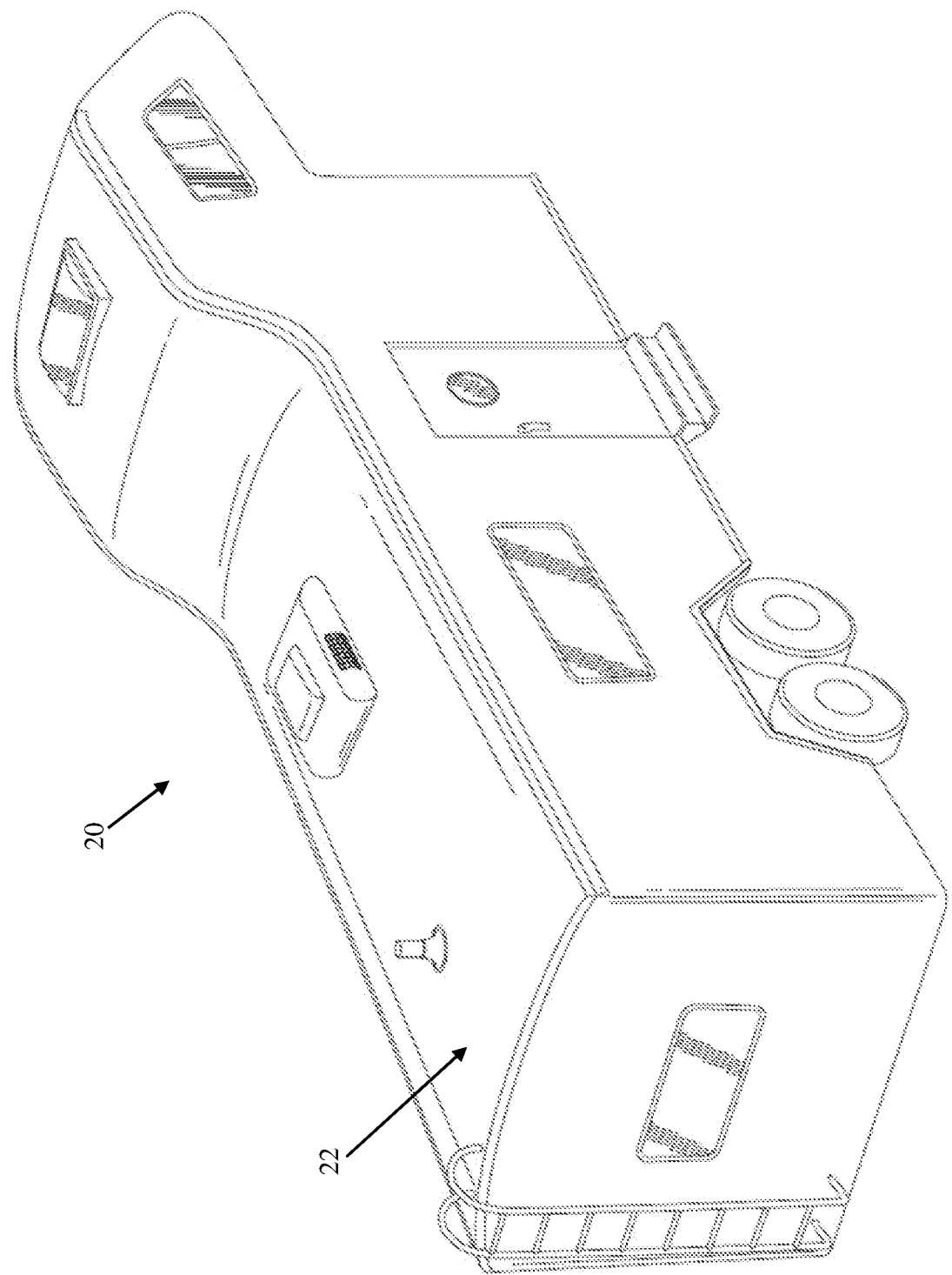
FIG. 1 is a perspective view of a recreational vehicle having a finished roof.
Figure 2:
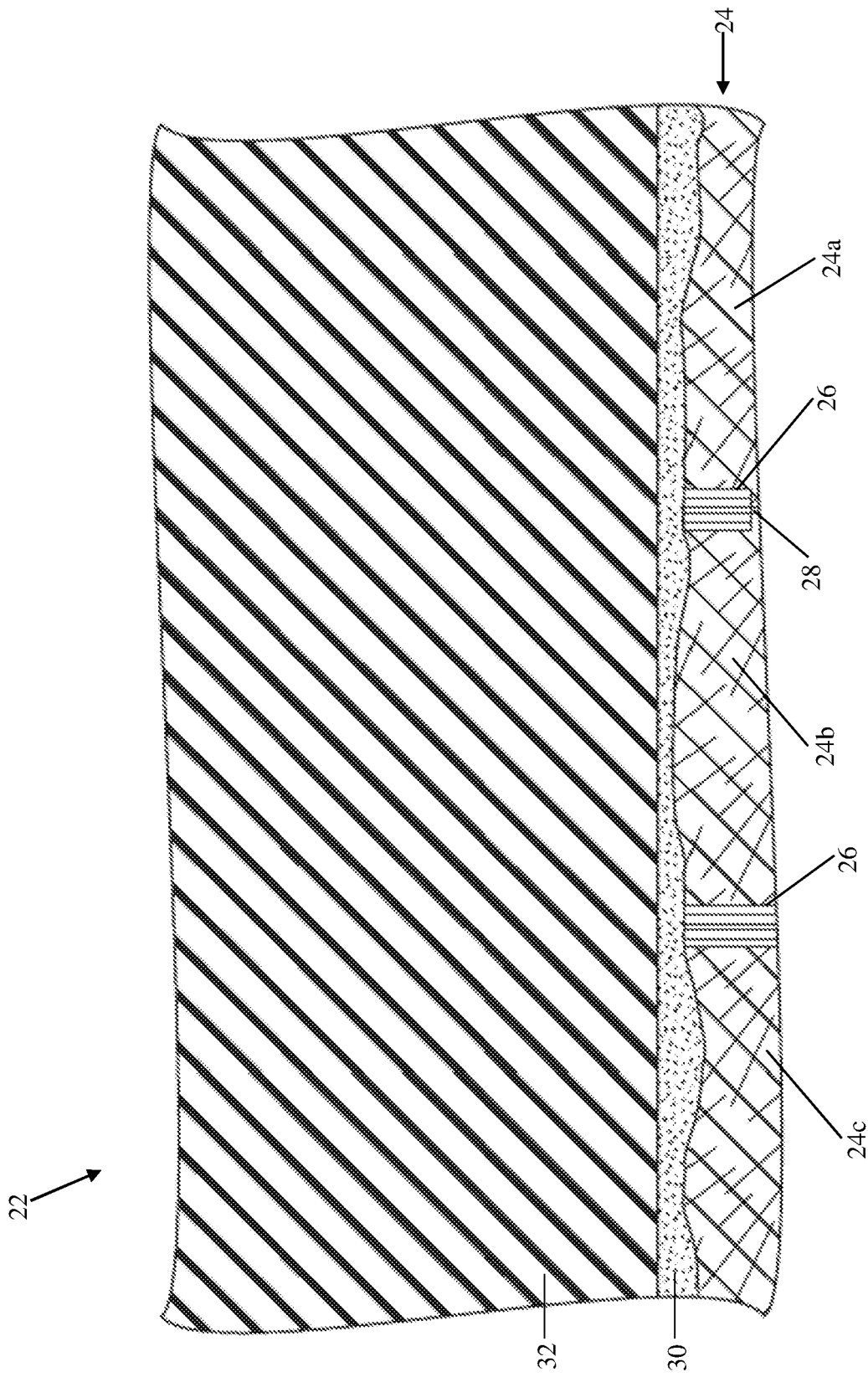
FIG. 2 is a top plan cutaway view of a portion of the finished roof of FIG. 1, depicting the various layers of the finished roof.
Figure 3:
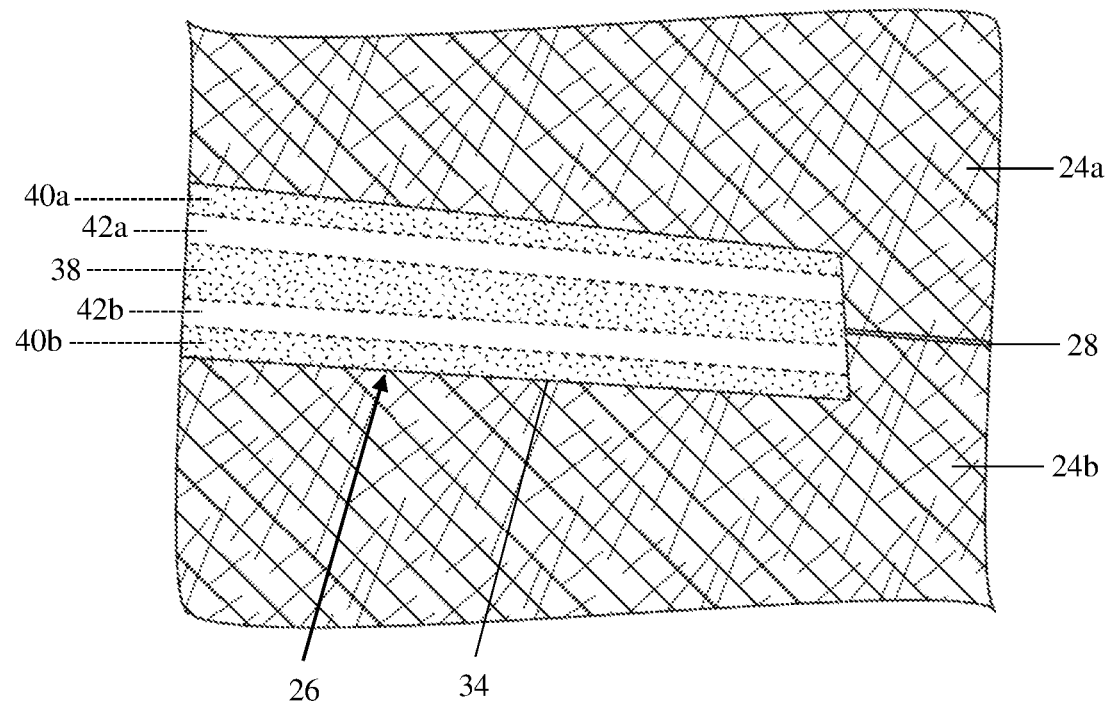
FIG. 3 is a top plan view of a channeled seam tape applied to adjacent wooden substrate surfaces.

The present invention will now be described with reference to the accompanying figures, wherein the numbered elements in the following written description correspond to like-numbered elements in the figures. A recreational vehicle (RV) 20 with a finished roof 22 is shown in FIG. 1. Roof 22 has various layers and features, including a lower wooden substrate layer 24 made of adjacent wooden substrate panels 24a-c that are affixed to structural elements of the RV 20, such as by fasteners (FIGS. 2 and 3). When constructing the roof, a channeled seam tape 26 is adhered to portions of the upper surfaces of adjacent wooden substrate panels 24a-c to cover the series of cover gaps or seams 28 located between the adjacent wooden substrate panels 24a-c. A layer of a water-based adhesive 30 is then applied over the wooden substrate 24 and tape 26 and used to bond a top layer of a roofing membrane 32, such as a rubber roofing membrane, to the wooden substrate 24. In the illustrated embodiment adhesive 30 is a water based adhesive that cures as its constituent water component seeps into the porous wooden substrate 24, leaving behind an adhesive residue that bonds rubber membrane 32 to wooden substrate 24. As discussed in more detail below, as adhesive 30 cures, water flows from adhesive 30 through channels in seam tape 26 and into wooden substrate 24, thereby inhibiting water from pooling on tape 26 and causing cosmetic roofing defects.

Figure 4:
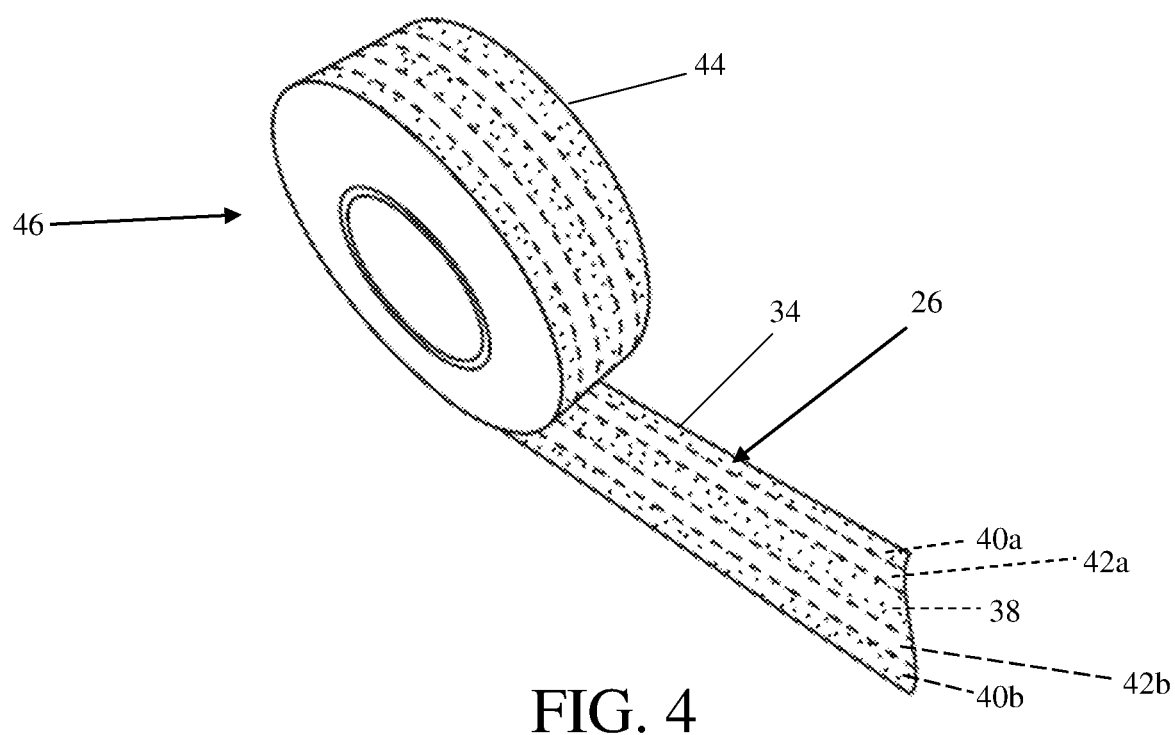
FIG. 4 is a perspective view of a roll of channeled seam tape.
Figure 5:
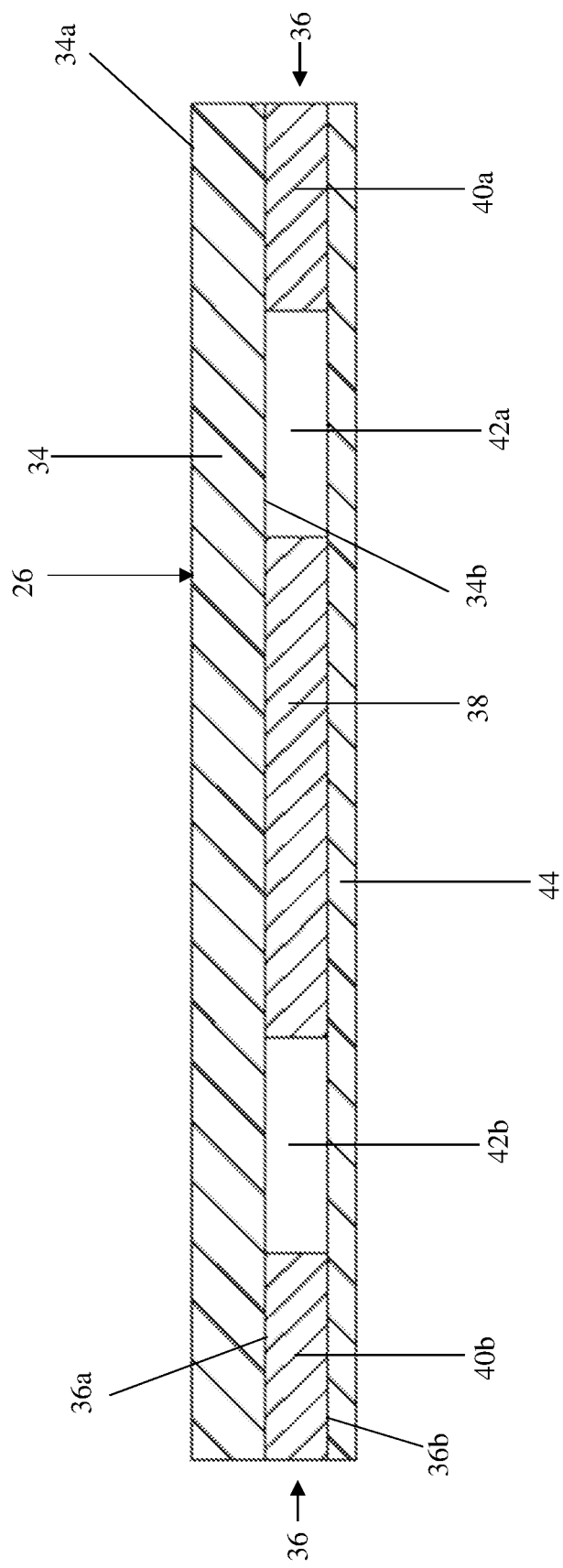
FIG. 5 is a cross-sectional view of the channeled seam tape of FIG. 4 along the width of the channeled seam tape.

Referring now to FIGS. 4 and 5 depicting a preferred embodiment, seam tape 26 includes a facer sheet 34 made of a liquid permeable material, such as a felt material formed of spunlace polyester. Facer sheet 34 has an upper facer surface 34a and a lower facer surface 34b. An adhesive portion 36 having an upper adhesive surface 36a and a lower adhesive surface 36b is coupled or applied to facer sheet 34 at lower facer surface 34b. In the illustrated embodiment, facer sheet 34 is two inches wide with adhesive portion 36 including a half-inch wide center adhesive strip 38 and a pair of quarter-inch wide outer adhesive strips 40a, 40b as measured along the width of seam tape 26, where adhesive strips 38, 40a and 40b each extend along the length of the seam tape 26 to form continuous adhesive strips, with each adhesive strip 38, 40a, 40b being a rubber-based adhesive. Adhesive strips 38, 40a and 40b form a channeled portion comprising a pair of half-inch wide channels 42a, 42b that are defined by adhesive portion 36 and separate outer adhesive strips 40a, 40b from center adhesive strip 38, whereby channels 42a, 42b likewise extend along the length of the seam tape 26. The noted dimensions are subject to normal manufacturing variability and it should be appreciated that alternatively sized tap, adhesive and channel widths may be employed. A removable liner 44, such as a paper release liner, covers adhesive portion 36 when tape 26 is not in use to prevent tape 26 from binding to itself while it is rolled up in a roll 46 as shown in FIG. 4. It should be appreciated that a channeled seam tape can have varying material and geometric properties in alternative embodiments while still remaining within the scope of the present invention. For example, in an alternative embodiment, a channeled seam tape may have more or less channels and/or adhesive strips with varying widths or that are discontinuous.

Referring to FIG. 1, tape 26 is well-suited for roof construction applications, and is particularly well-suited for constructing RV roofs, such as roof 22 located atop RV 20. In a preliminary step of constructing roof 22, the array of adjacent wooden substrate panels 24a-c are placed and secured to RV 20 as a lower layer of roof 22 (FIG. 2). After wooden substrates 24a-c have been secured to RV 20, tape 26 is applied to specific portions of wooden substrates 24a-c.

As shown in FIGS. 2 and 3, tape 26 is applied such that it covers a series of gaps or seams in wooden substrate 24. Gaps, such as gap 28, are generally defined where a pair adjacent wooden substrates, such as wooden substrates 24a and 24b, come into contact or close contact with one another. In one method of applying tape 26, a user first unrolls a portion of tape 26 from roll 46 (FIG. 4). The user then removes a portion of removable liner 44 by peeling it off adhesive portion 36. Then, the user centrally aligns center adhesive strip 38 with gap 28, such that each edge of center adhesive strip 38 overlaps with a respective edge of wooden substrates 24a, 24b where gap 28 is defined (FIGS. 2 and 3). While maintaining the alignment of center adhesive strip 38 as described above, tape 26 can then be pressed onto wooden substrates 24a, 24b such that center adhesive strip 38 adheres to both wooden substrates 24a, 24b over the seam 28, and outer adhesive strips 40a, 40b each adhere to wooden substrates 24a, 24b, respectively. In this manner, a respective channel 42a, 42b is disposed at each of the adjacent substrate panels 24a, 24b. The user continues to adhere tape 26 over gap 28 in this manner, unrolling tape 26 from roll 46 and peeling off removable liner 44 as needed, before severing or breaking a portion of tape 26 off from roll 46 in a length necessary to completely cover the remaining length of gap 28 with tape 26. This method is repeated to cover all of gaps in wooden substrate 24 between adjacent panels. It should be appreciated that the present method is an illustrative, non-limiting example of how tape 26 may be applied to a substrate, and that alternative methods and/or steps can be taken to apply a channeled seam tape to various substrates within the scope of the present invention.

Referring again to FIG. 2, after tape 26 has been applied to wooden substrate 24, adhesive 30 is then used to cover the entire upper surface of wooden substrate 24 and tape 26. Many methods can be undertaken to accomplish this task. For example, in one method, the user may collect adhesive on a roller brush by rolling the brush in a reservoir. The user may then evenly spread adhesive 30 across the upper surface of wooden substrate 24 and tape 26 by rolling the roller brush across their collective upper surface area.

After applying adhesive 30 across the entirety of the upper surface of wooden substrate 24 and tape 26, the user may then cover the layer of adhesive 30 with an upper layer, such as rubber membrane 32. Placing rubber membrane 32 over adhesive 30 is a time-sensitive task, and is preferably completed before any substantial curing of adhesive 30 has occurred. After rubber membrane 32 has been placed on top of the layer of adhesive 30, the curing process of adhesive 30 bonds rubber membrane 32 to wooden substrate 24.

Adhesive 30 cures through a process which in part involves the separation of some of its constituent components. In particular, a water carrier component is separated out of adhesive 30 and is absorbed by the porous wooden substrate 24 beneath adhesive 30. As water from adhesive 30 is absorbed by wooden substrate 24, a residual adhesive component is left behind and bonds the lower surface of rubber membrane 32 to the upper surface of wooden substrate 24.

As described above, adhesive 30 is applied to the upper surface of both wooden substrate 24 and tape 26. Water from the portions of adhesive 30 that are in direct contact with wooden substrate 24 may be absorbed directly into wooden substrate 24. However, water from the portions of adhesive 30 that are in direct contact with tape 26, such as at the upper surface 34a, is able to move through tape 26 before being absorbed by wooden substrate 24. Tape 26 facilitates the curing process of adhesive 30 by allowing the water of adhesive 30 to move through tape 26 and into wooden substrate 24, and in particular the water component of adhesive 30 disposed over tape 26 is able to flow through the porous facer at the channels 42a, 42b and through the channels 42a, 42b and into the porous wooden substrate panels 24a, 24b. Moreover, the central adhesive strip 38 inhibits air from passing through the seam 28 and thus inhibits air bubbles or pockets from forming cosmetic defects in the form of outwardly extending bulges in the roofing membrane 32. The wooden substrate may be configured as various forms of wooden panels, such as OSB boards, plywood sheets, particle board, or the like.

Referring to FIG. 5, water from adhesive 30 in direct contact with tape 26 must first pass through facer sheet 34. Because facer sheet 34 is made of a liquid permeable material, such as by way of being porous, water is able to penetrate and enter facer sheet 34 at upper facer surface 34a. Water then flows through and exits facer sheet 34 at the portions of lower facer surface 34b adjacent to channels 42a, 42b. Channels 42a, 42b provide a pathway for the water to flow into direct contact with the upper surface of wooden substrate 24 where it is absorbed into wooden substrate 24. The properties of the channeled portion may vary within the scope of the present invention.

The seam tape of the present invention thus provides a facer sheet that includes adhesive on one side to enable the seam tape to be applied to seams between adjacent panels, where the tape adhesive does not completely cover the entirety of the undersurface of the tape such that channels are formed whereby the liquid component of an adhesive, such as a water component of a water based adhesive, may flow through the liquid permeable facer sheet at the channels to be absorbed by a porous substrate, such as wooden panels. Thus, in accordance with aspects of the channeled seam tape of the present invention, a facer sheet is made of a liquid permeable material and thus allows for water transmission there through. Additionally, an adhesive portion coupled to the facer sheet only covers a portion of the facer to allow water transmission through a channeled portion. As such, water is able to move through the channeled seam tape from a non-adhered, facer side of the tape to the opposing side of the tape that is adhered to a surface. Although shown in connection with an RV, it should be appreciated that the tape of the present invention is useable in connection with other structures, such as building structures that are not moveable, such as a roof of a stationary house or building.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A channeled seam tape substrate sealing system comprising:
    a pair of adjacent substrate panels forming a seam therebetween;
    a channeled seam tape comprising a liquid permeable facer sheet having an upper surface and a lower surface with an adhesive portion disposed on the lower surface, said adhesive portion comprising a plurality of adhesive strips extending along a length of the channeled seam tape with said plurality of adhesive strips comprising a pair of side strips and a central strip disposed between said side strips, wherein each said side strip is spaced from said central strip to define a pair of channels at which said lower surface of said facer sheet is exposed;
    wherein said channeled seam tape is affixed to said pair of adjacent substrate panels with said central strip disposed over said seam and adhering to both said substrate panels and with each said side strip affixed to a respective one of said substrate panels such that respective ones of said channels are disposed over respective ones of said substrate panels.

2. The channeled seam tape substrate sealing system of claim 1, further comprising a roofing adhesive disposed over said substrate panels and said upper surface of said channeled seam tape.

3. The channeled seam tape substrate sealing system of claim 2, further comprising a roofing membrane disposed over said roofing adhesive.

4. The channeled seam tape substrate sealing system of claim 1, wherein said channeled seam tape has distal ends defining a length of said channeled seam tape, and wherein said central strip comprises and elongate continuous adhesive strip extending along the entire length of said channeled seam tape.

5. The channeled seam tape substrate sealing system of claim 4, wherein said side strips comprise elongate continuous adhesive strips extending along the entire length of said channeled seam tape.

6. The channeled seam tape substrate sealing system of claim 5, wherein said facer sheet comprises opposing lateral edges, and wherein said side strips each comprise an outer lateral side that is flush relative to a respective said outer lateral edge.

7. The channeled seam tape substrate sealing system of claim 1, wherein said central strip has a width that is wider than widths of said side strips.

8. The channeled seam tape substrate sealing system of claim 1, wherein said facer sheet comprises a spunlace polyester material.

9. The channeled seam tape substrate sealing system of claim 1, wherein said adhesive strips comprise a rubber-based adhesive.

10. A channeled seam tape comprising:
    a liquid permeable facer sheet;
    an adhesive portion coupled to said facer sheet, said adhesive portion defining a channeled portion; and
    a removable liner disposed over said adhesive portion and configured to be removed from said adhesive portion;
    wherein said adhesive portion is configured to be applied to a pair of adjacent substrate surfaces by:
        removing said removable liner from said adhesive portion;
        disposing said adhesive portion over a gap located between the substrate surfaces; and
        pressing said adhesive portion onto the substrate surfaces; and
    wherein once said adhesive portion has been applied to the substrate surfaces, said adhesive portion is adhered to each substrate surface;
    wherein said channeled portion comprises a pair of channels, and wherein said adhesive portion comprises a center adhesive strip and a pair of outer adhesive strips, wherein said center adhesive strip is spaced between said pair of outer adhesive strips by said channels, and wherein said center adhesive strip has a width greater than the width of either of said outer adhesive strips.

11. The channeled seam tape of claim 10, wherein said facer sheet comprises opposing outer lateral edges, and wherein said outer adhesive strips each comprise an outer lateral side that is flush relative to respective said outer lateral edge.

12. The channeled seam tape of claim 11, wherein said center adhesive strip is parallel to said outer adhesive strips.

13. The channeled seam tape of claim 10, wherein said facer sheet comprises a spunlace polyester material.

14. The channeled seam tape of claim 10, wherein said adhesive strips comprise a rubber-based adhesive.

15. The channeled seam tape of claim 10, wherein said adhesive portion comprises a pair of outer adhesive strips spaced apart from one another by said channeled portion.

16. The channeled seam tape of claim 15, wherein said facer sheet comprises opposing outer lateral edges, and wherein said outer adhesive strips are each disposed flush relative to each respective said outer lateral edge.

17. A method of roofing a structure, said method comprising:
    placing substrate panels adjacent one another, wherein a seam is formed between adjacent panels;
    securing a tape over the seam between the panels, wherein the tape comprises a liquid permeable facer sheet having an upper surface and a lower surface, and a tape adhesive portion disposed on the lower surface of the facer sheet, wherein the tape adhesive portion comprises a plurality of adhesive strips extending along a length of the tape with the plurality of adhesive strips comprising a pair of side strips and a central strip disposed between the side strips, wherein each of the side strips is spaced from the central strip to define a pair of channels at which the lower surface of the facer sheet is exposed to thereby define exposed lower surface portions whereby liquid is able to flow through the facer sheet from the upper surface to the lower surface at the exposed lower surface portions, and wherein the tape adhesive portion is applied to the adjacent substrate panels during said securing the tape over the seam between the panels with the central strip disposed over the seam and adhering to each of the adjacent substrate panels and with each side strip affixed to a respective one of the adjacent substrate panels such that respective ones of the channels are disposed over respective ones of the adjacent substrate panels; and applying a roofing adhesive over the substrate panels and the upper surface of the tape;
placing a roofing membrane over the roofing adhesive; and
curing the roofing adhesive to secure the roofing membrane to the substrate panels.

18. The method of claim 17, wherein the roofing adhesive comprises a water based adhesive and wherein a water component of the water based adhesive at the upper surface of the tape flows through the facer sheet during said curing the roofing adhesive.

19. The method of claim 17, wherein the two side strips are disposed at edges of the facer sheet defined by a width of the facer sheet.

20. The method of claim 17, wherein the tape further comprises a releasable release sheet disposed on the tape adhesive portion opposite the facer sheet, and wherein said method further comprises removing the release sheet to expose the tape adhesive portion prior to said securing the tape over the seam between the panels.

* * * * *